(12) United States Patent
Yamaguchi et al.

(10) Patent No.: US 10,262,802 B2
(45) Date of Patent: Apr. 16, 2019

(54) CAPACITOR AND METHOD FOR MANUFACTURING SAME

(71) Applicant: NIPPON CHEMI-CON CORPORATION, Tokyo (JP)

(72) Inventors: Ayumu Yamaguchi, Tokyo (JP); Yuichi Nakano, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 15/718,464

(22) Filed: Sep. 28, 2017

(65) Prior Publication Data

US 2018/0019061 A1   Jan. 18, 2018

Related U.S. Application Data

(63) Continuation of application No. PCT/JP2016/001750, filed on Mar. 25, 2016.

(30) Foreign Application Priority Data

Mar. 30, 2015  (JP) ................................ 2015-068231
Mar. 30, 2015  (JP) ................................ 2015-068253

(51) Int. Cl.
*H01G 4/30* (2006.01)
*H01G 4/232* (2006.01)
(Continued)

(52) U.S. Cl.
CPC ............. *H01G 4/30* (2013.01); *H01G 4/012* (2013.01); *H01G 4/232* (2013.01); *H01G 4/236* (2013.01); *H01G 4/38* (2013.01); *H01G 4/12* (2013.01)

(58) Field of Classification Search
None
See application file for complete search history.

(56) References Cited

U.S. PATENT DOCUMENTS 3,187,242 A * 6/1965 Schick .................. H01G 4/248
                                                     228/120
4,959,652 A * 9/1990 Hirama .................. H01G 2/065
                                                     29/25.42
(Continued)

FOREIGN PATENT DOCUMENTS

JP    58-106816       6/1983
JP    62-65824 U      4/1987
(Continued)

OTHER PUBLICATIONS

International Search Report dated Jun. 7, 2016, issued in counterpart International Application No. PCT/JP2016/001750 (2 pages).
(Continued)

*Primary Examiner* — Dion Ferguson
(74) *Attorney, Agent, or Firm* — Westerman, Hattori, Daniels & Adrian, LLP (57) ABSTRACT

A capacitor includes a capacitor element having internal electrodes and dielectric layers, the internal electrodes and the dielectric layers being alternately laminated; a first electrode layer formed on an edge surface of the capacitor element and connected to an internal electrode of the internal electrodes; and a second electrode layer formed into a mesh shape or a dot shape on the first electrode layer.

15 Claims, 6 Drawing Sheets

(51) Int. Cl.
  *H01G 4/012* (2006.01)
  *H01G 4/236* (2006.01)
  *H01G 4/38* (2006.01)
  *H01G 4/12* (2006.01)

(56) References Cited

U.S. PATENT DOCUMENTS

| | | | |
|---|---|---|---|
| 6,316,726 B1 | 11/2001 | Hidaka et al. | |
| 2014/0041930 A1* | 2/2014 | Yanagida | H05K 7/00 174/549 |
| 2014/0204502 A1 | 7/2014 | Chun et al. | |
| 2016/0181017 A1* | 6/2016 | Kamigaki | C08K 3/00 174/260 |

FOREIGN PATENT DOCUMENTS

| | | |
|---|---|---|
| JP | 63-128713 U | 8/1988 |
| JP | H2-153514 A | 6/1990 |
| JP | 5-29173 A | 2/1993 |
| JP | 11-340086 A | 12/1999 |
| JP | 2000-216045 A | 8/2000 |
| JP | 2002-367848 A | 12/2002 |
| JP | 2007-158046 A | 6/2007 |
| JP | 2013-225679 A | 10/2013 |

OTHER PUBLICATIONS

Written Opinion of the International Searching Authority (Form PCT/ISA/237) dated Jun. 7, 2016, issued in counterpart International Application No. PCT/JP2016/001750 (4 pages).
Notification of Transmittal of Translation of the International Preliminary Report on Patentability (Form PCT/IB/338) issued in counterpart International Application No. PCT/JP2016/001750 dated Oct. 12, 2017, with Forms PCT/IB/373, PCT/IB/326, and PCT/ISA/237. (13 pages).
Office Action dated Sep. 18, 2018, issued in counterpart Japanese application No. 2015-068231, with English translation. (6 pages).
Office Action dated Sep. 18, 2018, issued in counterpart Japanese application No. 2015-068253, with English translation. (5 pages).
Extended (supplementary) European Search Report dated Nov. 23, 2018, issued in counterpart European Application No. 16771754.5. (7 pages).

* cited by examiner

FIG.6

CAPACITOR AND METHOD FOR MANUFACTURING SAME

CROSS-REFERENCE TO RELATED APPLICATIONS

This application is a continuation of International Application No. PCT/JP2016/001750, filed on Mar. 25, 2016, which is entitled to the benefit of priority of Japanese Patent Application No. 2015-068231, filed on Mar. 30, 2015, and Japanese Patent Application No. 2015-068253, filed on Mar. 30, 2015, the contents of which are hereby incorporated by reference.

BACKGROUND OF THE INVENTION i) Field of the Invention

The present invention relates to an external electrode structure of a laminated ceramic capacitor etc. and a technique for manufacturing the same.

ii) Description of the Related Art

Laminated ceramic capacitors are excellent in electric characteristics such as increased capacitance and high frequency characteristics.

For a laminated ceramic capacitor having such characteristics, for example, internal electrodes are formed in a sheet-like ceramic dielectric and alternately laminated and sintered to form an element, and an external electrode layer of copper, silver, etc. is formed on an exposed portion of one of the internal electrodes exposed from this element body. The external electrode layer is made up of an underlying electrode layer that is made of copper etc. and is grounded to the exposed portion of the internal electrode and an overlying electrode layer that is made of silver etc. advantageous to soldering and is formed on the underlying electrode layer. It is known that an external terminal such as a lead wire is soldered to the external electrode layer for connection to a substrate through the lead wire and that the ceramic capacitor is directly placed on the substrate with the external electrode layer soldered to the substrate (e.g., Japanese Unexamined Utility Model Application Publication No. 63-128713 and Japanese Unexamined Utility Model Application Publication No. 62-65824). Soldering is generally accompanied by heating.

BRIEF SUMMARY OF THE INVENTION

A laminated ceramic capacitor has capacitance proportional to an area of an internal electrode and may be increased in capacitance by, for example, increasing the number of laminated layers of internal electrodes or enlarging the surface area per layer of the internal electrodes. The increased number of laminated layers or the enlargement of the surface area of the internal electrodes leads to an increase in size of the ceramic capacitor. Accordingly, the area of the external electrode layer tends to increase and the area of application of the upper electrode layer also becomes larger. A ceramic capacitor is formed by applying and firing copper, silver, etc. serving as the external electrode layer in the manufacturing process of the ceramic capacitor. In the firing process, the ceramic capacitor is exposed to high temperature, and a distortion occurs because thermal expansion coefficients differ between a ceramic dielectric and the metal constituting the external electrode layer, especially silver. Therefore, the thermal expansion coefficient of the ceramic dielectric in the element is smaller than that of the metal such as silver constituting the external electrode layer and, when the ceramic capacitor is exposed to a high temperature of a firing treatment etc., a distortion occurs in a grounding portion between the ceramic dielectric and the external electrode due to a difference between the thermal expansion coefficients, causing a problem that cracking easily occurs in the ceramic dielectric.

Japanese Unexamined Utility Model Application Publication No. 63-128713 and Japanese Unexamined Utility Model Application Publication No. 62-65824 do not disclose or suggest such a requirement and a problem and do not disclose or suggest a configuration etc. for solving the problem.

In view of the problem, a main object of the present invention is to prevent a product deterioration such as cracking of the ceramic dielectric due to heating through a form of an external electrode layer.

According to an aspect of the present invention, a capacitor includes a capacitor element having internal electrodes and dielectric layers, the internal electrodes and the dielectric layers being alternately laminated; a first electrode layer formed on an edge surface of the capacitor element and connected to an internal electrode of the internal electrodes; and a second electrode layer formed into a mesh shape or a dot shape on the first electrode layer.

According to an aspect of the present invention, a method for manufacturing a capacitor includes laminating internal electrodes and dielectric layers into a plurality of layers to form a capacitor element; forming a first electrode layer on an edge surface portion of the capacitor element, the first electrode layer being connected to an internal electrode of the internal electrodes; and forming a mesh-shaped or dot-shaped second electrode layer on the first electrode layer.

Other objects, features, and advantages of the present invention will become more apparent by reference to the accompanying drawings and embodiments.

BRIEF DESCRIPTION OF THE SEVERAL VIEWS OF THE DRAWING

A of FIG. 2 is a diagram of a cross section taken along a line IIa-IIa of the capacitor shown in FIG. 1 and B of FIG. 2 is a cross section taken along a line IIb-IIb of the capacitor shown in FIG. 1.

A of FIG. 3 is a diagram of an element before connecting a lead wire and B of FIG. 3 is a cross section taken along a line IIIb-IIIb of the element shown in A of FIG. 3.

A of FIG. 4 is a diagram of a capacitor viewed from the lead-wire connection surface side and B of FIG. 4 is a cross section taken along a line IVb-IVb of the capacitor shown in A of FIG. 4.

A and B of FIG. 5 are a diagram of a relationship between solder connection and occurrence of cracking and a formation region of a solder non-adhesive layer.

DETAILED DESCRIPTION OF THE INVENTION

Embodiment

Figure 1:
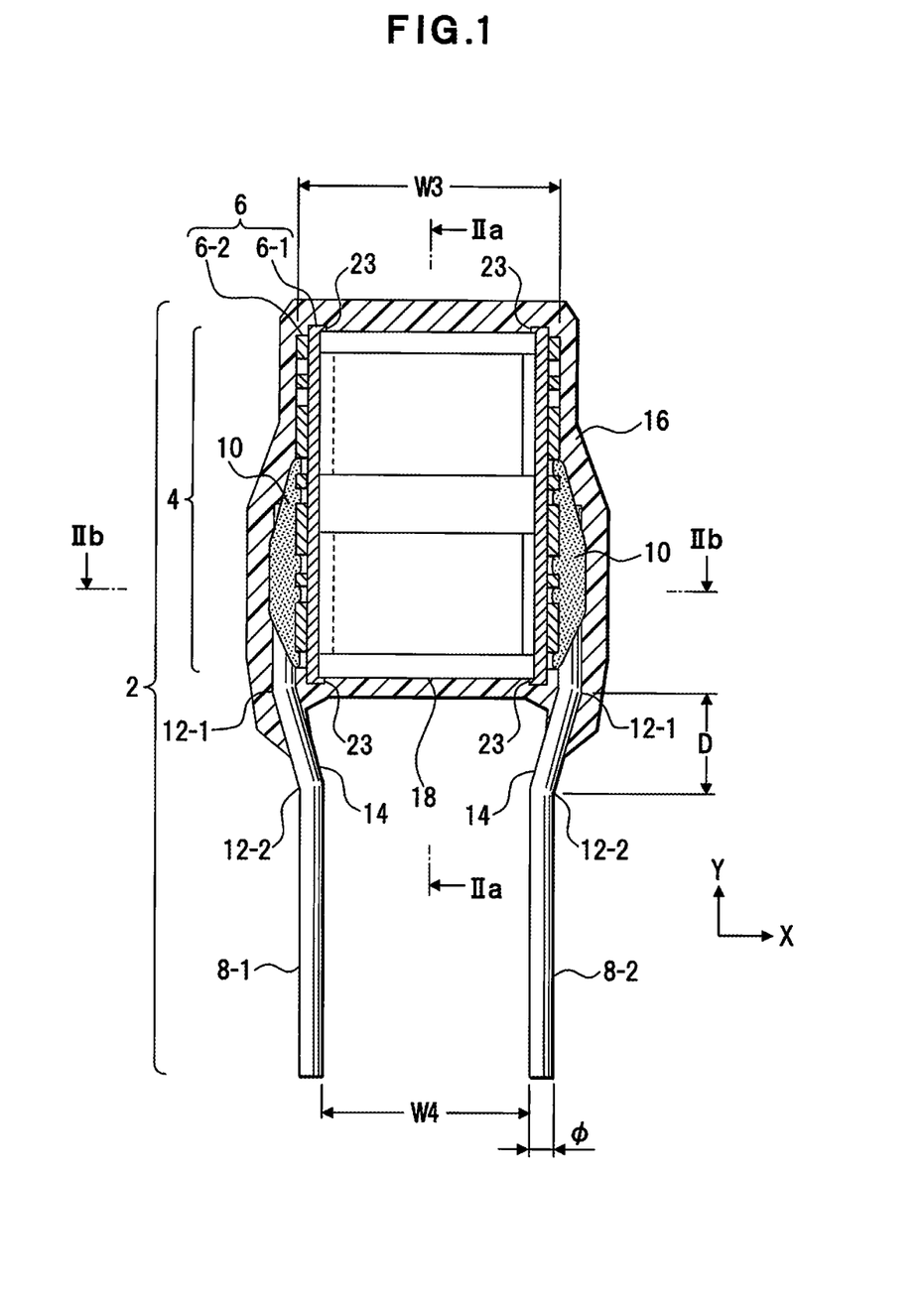
FIG. 1 is a diagram of a cross section of a capacitor according to an embodiment.

FIG. 1 shows a cross section of a laminated ceramic capacitor according to an embodiment. This laminated ceramic capacitor (hereinafter simply referred to as a "capacitor") 2 is an example of a capacitor of the present invention, and the present invention is not limited to this configuration.

This capacitor 2 includes, by way of example, a rectangular laminated ceramic capacitor element (hereinafter simply referred to as an "element") 4.

Copper electrode layers 6-1 as an example of an underlying electrode of an external electrode 6 are formed on an edge surface portion of the element 4 in a short direction (X-axis direction) of the element 4, for example, and silver electrode layers 6-2 as an example of an overlying electrode of the external electrode 6 are formed on the copper electrode layers 6-1. The copper electrode layers 6-1 are an example of first electrode layers, and the silver electrode layers 6-2 are an example of second electrode layers.

Lead wires 8-1, 8-2 are disposed on surface portions of the respective silver electrode layers 6-2 and connected to the silver electrode layers 6-2 with solders 10. As a result, electric connection to the element 4 side is achieved by the copper electrode layers 6-1, and connections to the lead wires 8-1, 8-2 are achieved by the silver electrode layers 6-2 fixedly attached to the copper electrode layers 6-1.

An exterior resin layer 16 covering the outer surface is formed on the element 4, and the exterior resin layer 16 covers the element 4, the edge portions of the copper electrode layers 6-1, the silver electrode layers 6-2, and the lead wires 8-1, 8-2 from the element 4 side to middle portions of slope portions 14 of the lead wires 8-1, 8-2.

Each of the lead wires 8-1, 8-2 has a middle portion with, for example, a bent portion 12-1 formed at a position near an element end 18 and a bent portion 12-2 formed at a position distant from the element end 18, and the slope portion 14 is formed between the bent portions 12-1, 12-2.

Figure 2:
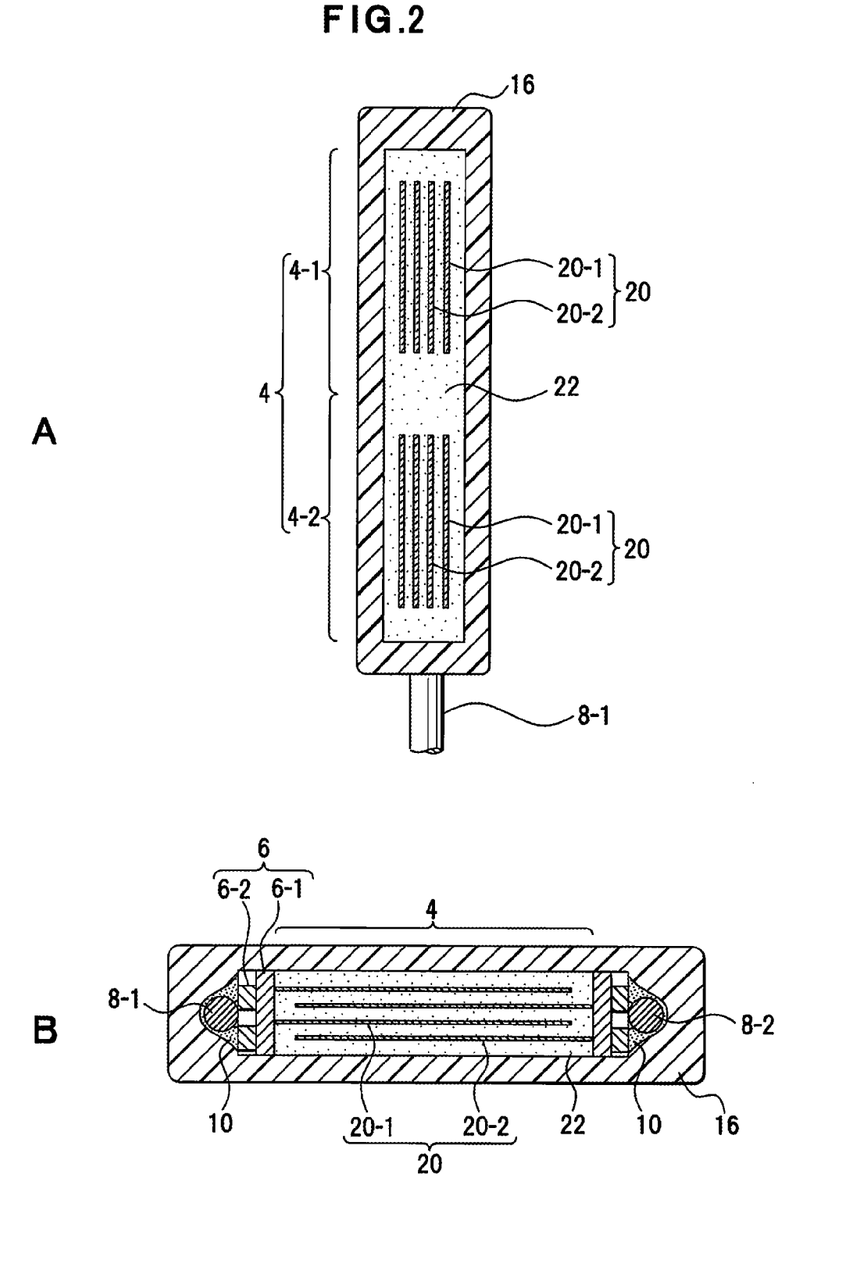

A of FIG. 2 shows a cross section taken along line IIa-IIa of FIG. 1. The element 4 of this embodiment includes two element bodies 4-1, 4-2 as an example of a plurality of unit elements. Each of the element bodies 4-1, 4-2 includes a plurality of internal electrodes 20 and ceramic dielectrics 22, the internal electrodes 20 and the ceramic dielectrics 22 are alternately provided with each other, and each of the element bodies 4-1, 4-2 is an example of an internal electrode group. A plurality of internal electrodes 20-1 is present on the lead wire 8-1 side and a plurality of internal electrodes 20-2 is present on the lead wire 8-2 side.

$BaTiO_3$ (barium titanate) based ceramics can be used for the ceramic dielectrics 22 of the element 4. (Ba, Ca, Sr) (Ti, Zr) $O_3$ based ceramics as other examples of constituent material may be used. The (Ba, Ca, Sr) (Ti, Zr) $O_3$ based ceramics are acquired by substituting a portion of Ba (barium) with Ca or Sr, or substituting a portion of Ti (titanium) with Zr, in the $BaTiO_3$ based ceramics.

A noble metal such as Ag, Ag—Pd, Pd and Cu, and an alloy thereof as well as a base metal such as Ni and Al may be used for the internal electrodes 20, and a material appropriately selected from these noble and base metals may be used for the internal electrodes 20.

Although the copper electrode layers 6-1 and the silver electrode layers 6-2 are used for the external electrodes 6, a conductive metal may be used in addition to these Cu, Ag, Ni, etc. If Ni is used for the internal electrodes 20, the copper electrode layer 6-1 is preferable as the first electrode layer because of favorable connectivity to Ni. In this case, since copper has a problem of connectivity to solder that is a means of connection to the outside, the silver electrode layer 6-2 having favorable solderability is preferably formed on the copper electrode layer 6-1. For the first electrode layer, an alloy of Ag and Pd or an alloy of Ni and Cu is effectively used in addition to Cu. An electrode material used instead of the silver electrode layer 6-2 may be any solderable metal.

B of FIG. 2 shows a cross section taken along a line IIb-IIb of FIG. 1. According to the manufacturing method described above, edges portions of the alternately arranged internal electrodes 20-1, 20-2 as the internal electrodes 20 can be exposed on edge surface portions of the element 4.

The copper electrode layers 6-1 are formed on the respective edge surface portions of the element 4, the internal electrodes 20-1 are connected to one of the copper electrode layers 6-1, and the internal electrodes 20-2 are connected to the other copper electrode layer 6-1. The silver electrode layers 6-2 are formed on the copper electrode layers 6-1.

After the lead wire 8-1 or the lead wire 8-2 is disposed on the silver electrode layers 6-2 as described above and connected by the solder 10, the element 4, the lead wires 8-1, 8-2 on the element 4, the edge portions of the copper electrode layers 6-1, and the exposed portions of the silver electrode layers 6-2 are covered with the exterior resin layer 16.

A method for manufacturing the element 4 of the capacitor 2 includes, by way of an example, forming a ceramic dielectric sheet, forming on a surface thereof a plurality of the internal electrodes 20 by application or printing, and forming the ceramic dielectric 22 thereon. A plurality of the internal electrodes 20 is formed on this ceramic dielectric 22 by application or printing, and the ceramic dielectric 22 is formed thereon. After a laminated block body formed through such a lamination process is fired, the element 4 is cut out and generated from the laminated block body. For example, the element 4 may be either an element chip having a range of the one internal electrode 20 or an element chip having a range of a plurality of the internal electrodes 20 in a planar direction, for example, the two internal electrodes 20 in a planar direction as in this embodiment.

Figure 3:
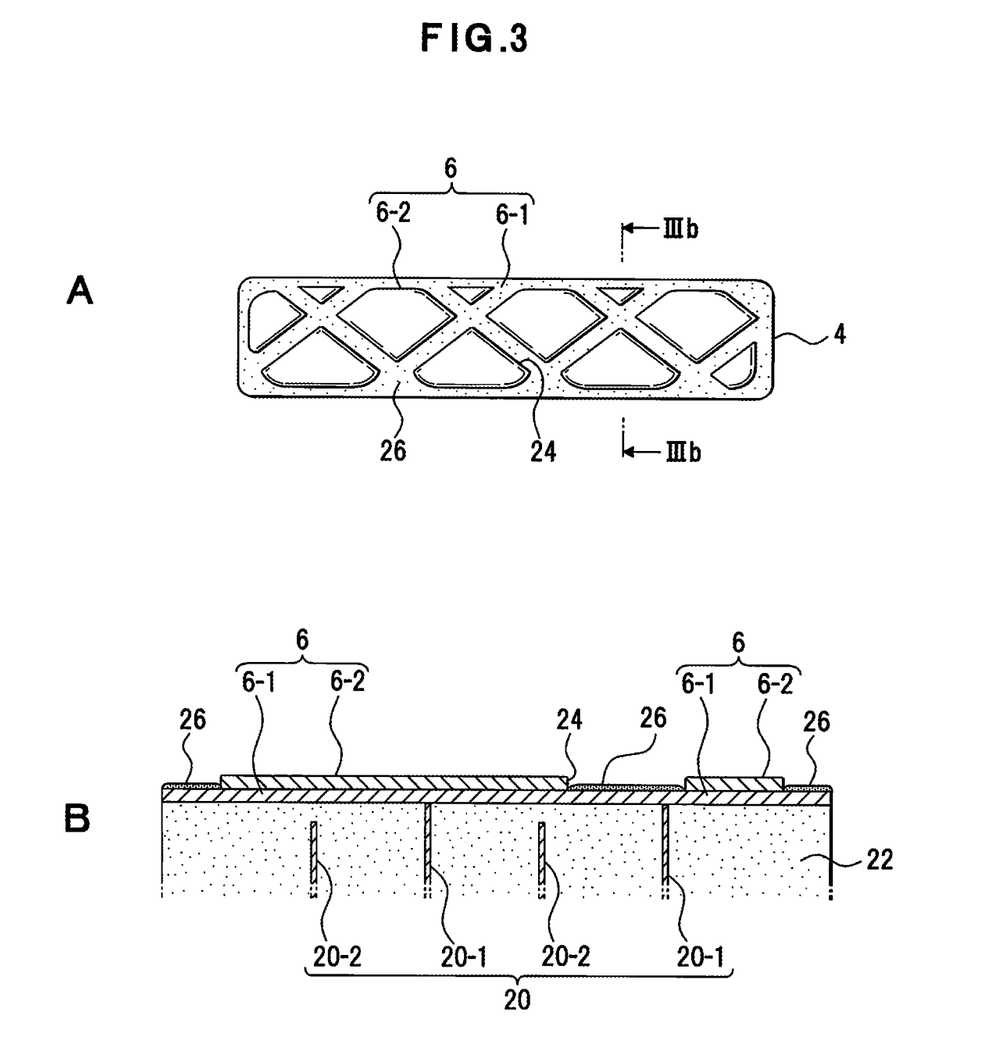

A of FIG. 3 shows the element 4 provided with the silver electrode layer 6-2 formed on the copper electrode layer 6-1. B of FIG. 3 shows a cross section taken along a line IIIb-IIIb of the element 4 shown in A of FIG. 3.

On the edge surface of the element 4, the copper electrode layer 6-1 connected to the internal electrodes 20-1 as one part of the internal electrodes 20 is formed. On the surface of this copper electrode layer 6-1, for example, the silver electrode layer 6-2 is formed by application of an electrode material in a mesh shape. Therefore, the silver electrode layer 6-2 has a plurality of window portions 24 formed into a mesh shape.

On the exposed surface of the copper electrode layer 6-1 exposed from the window portions 24, an oxidation treatment layer 26 as an example of a solder non-adhesive layer for avoiding adhesion of solder is formed by an oxidation treatment.

Figure 4:
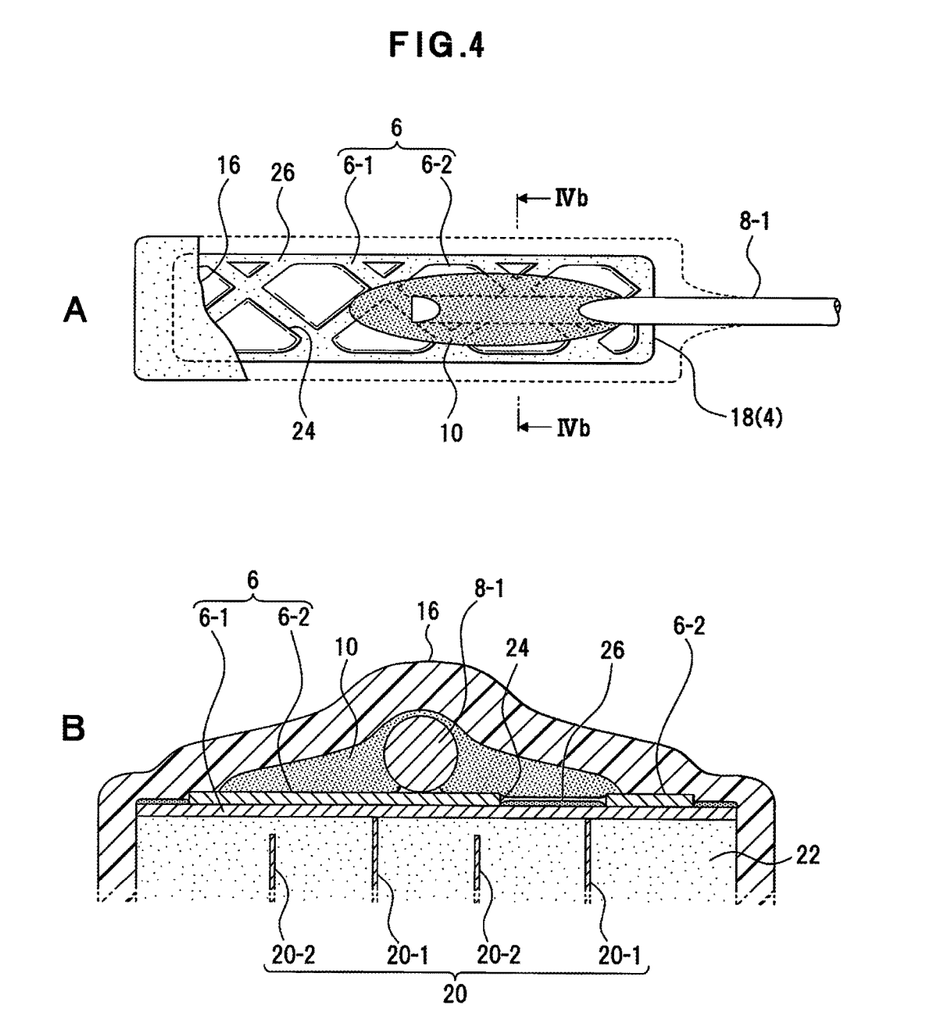

A of FIG. 4 shows the element 4 provided with the lead terminal 8-1 (8-2) on the silver electrode layer 6-2. B of FIG. 4 shows a cross section taken along a line IVb-IVb of the element 4 shown in A of FIG. 4.

On the upper surface of the silver electrode layer 6-2, the lead wire 8-1 is disposed within one-half width from the element end 18 side in a longitudinal direction of the silver electrode layer 6-2, Y-axis direction in FIG. 1, and is connected by the solder 10. Although not shown, the lead wire 8-2 is also disposed within one-half width from the element end 18 side in the longitudinal direction of the silver electrode layer 6-2, Y-axis direction in FIG. 1, and is connected by the solder 10.

The exterior resin layer 16 is formed on a region in which the lead wires 8-1, 8-2 are covered by the solders 10 on the silver electrode layers 6-2, so that the element 4, the silver electrode layers 6-2, the solders 10, and portions of the lead wires 8-1, 8-2 are covered with the exterior resin layer 16.

Since the oxidation treatment layer 26 is formed as the solder non-adhesive layer on the copper electrode layer 6-1 exposed from the window portions 24 of the silver electrode layer 6-2, the adhesion of the solder 10 is avoided as shown in B of FIG. 4. Therefore, the adhesion surface to the solder 10 is a range limited to the silver electrode layer 6-2 surrounded by the window portions 24. In other words, the solder 10 is bonded onto the mesh-shaped silver electrode layer 6-2 while the adhesion to the oxidation treatment layer 26 is avoided, and the connection surfaces between the lead wires 8-1, 8-2 and the element 4 are limited to the surface of the mesh-shaped silver electrode layers 6-2. As a result, the bonding area between the external electrode 6 and the solder 10 can be narrowed.

In this embodiment, the silver electrode layer 6-2 is formed into a mesh shape to form the plurality of the window portions 24. However, the silver electrode layer 6-2 may be formed into a dot shape instead of the mesh shape. If the silver electrode layer 6-2 is formed into the dot shape, the connection region of the solder 10 can be limited to the dot shape to narrow the bonding area between the external electrode 6 and the solder 10.

Effects Etc. of Embodiment

Features and advantages of this embodiment are listed as follows.

(1) While the thermal expansion coefficient of the ceramic dielectrics 22 of the element 4 is smaller than that of silver constituting the silver electrode layers 6-2 and a distortion occurs due to a difference between the thermal expansion coefficients at the time of heating for a firing treatment etc. of the silver electrode layers 6-2 and there is a problem that cracking easily occurs, since the formation area of the silver electrode layers 6-2 is reduced and the area of occurrence of the distortion due to thermal expansion is narrowed, a product deterioration such as cracking can be prevented.

(2) The element 4 includes, for example, the two element bodies 4-1, 4-2 as a plurality of unit elements and, when the electrostatic capacities of the element bodies 4-1, 4-2 are C1, C2 respectively, because of the parallelization of the element bodies 4-1, 4-2, a composite capacitance C of the element 4 is as follows:

$$C = C1 + C2 \quad (1),$$

where C>C1, C>C2, so that the increased capacitance of the capacitor 2 is achieved.

(3) By forming the silver electrode layer 6-2 serving as a portion of the external electrode 6 of the element 4 into a mesh shape or a dot shape, the overlap of the lead wires 8-1, 8-2 and the connection region of the solder 10 are narrowed, so that a stress applied from the lead wires 8-1, 8-2 to the element 4 side can be reduced.

(4) Since the element 4 is covered with the exterior resin layer 16 from above the soldered lead wires 8-1, 8-2, a connection strength is not reduced between the lead wires 8-1, 8-2 and the element 4, and the connection strength between the lead wires 8-1, 8-2 and the element 4 can be reinforced by the exterior resin layer 16.

(5) The internal electrodes 20 of the element 4 are connected in parallel by the copper electrode layers 6-1 of the external electrodes 6. Therefore, even when the silver electrode layers 6-2 are formed into the mesh shape or the dot shape, the internal resistance is not increased. Even if the connection range of the lead wires 8-1, 8-2 connected to the silver electrode layers 6-2 of the external electrodes 6 is reduced with the mesh shape or the dot shape, the capacitor characteristics do not deteriorate and the equivalent series resistance of the capacitor 2 is not increased.

(6) Even when an external force acts on the lead wires 8-1, 8-2, the stress applied from root portions of the lead wires 8-1, 8-2 to connection portions with the element 4 can be reduced to prevent the deterioration of the connection portions of the lead wires 8-1, 8-2 and the breakage of the lead wires.

(7) Since the oxidation treatment layer 26 is formed by the oxidation treatment on the surface of the copper electrode layer 6-1 exposed from the mesh-like window portions 24 of the silver electrode layer 6-2 or the dot-shaped silver electrode layer 6-2 and has a roughened state, the oxidation treatment layer 26 to which the solder 10 does not adhere has high adhesion to the exterior resin layer 16, so that the integration of the exterior resin layer 16 and the element 4 can be achieved along with increased robustness of the capacitor 2.

(8) The product deterioration can be prevented and the reliability of the capacitor can be increased.

Example 1

Figure 5:
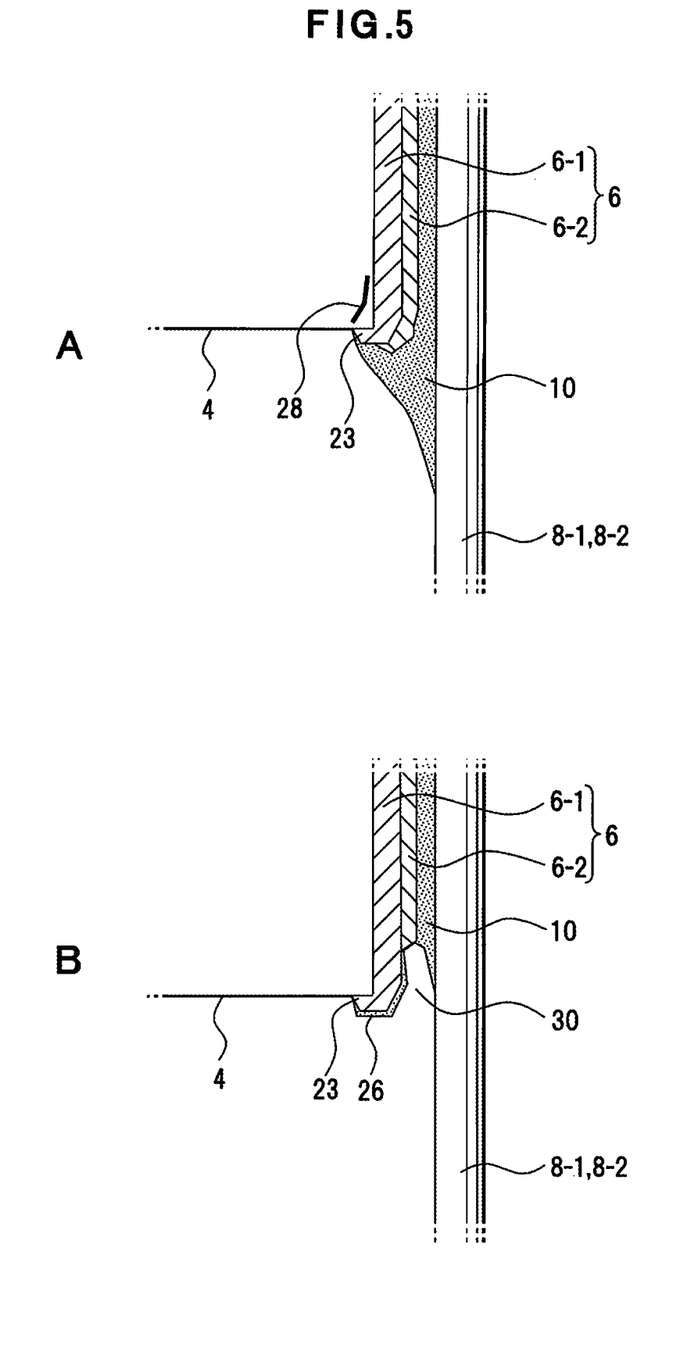

A of FIG. 5 shows the case of the solder 10 adhering to edge portions of the copper electrode layer 6-1 and the silver electrode layer 6-2.

If the adhesion range of the solder 10 extends to the lower edge side of the element 4 in this way, the integration of the solder 10 and the element 4 side is strengthened, while the solder 10 may be disposed not only on the external electrode 6 but also directly on the ceramic dielectrics 22. In this case, a distortion may occur in the disposition portion of the solder 10 on the external electrode 6 due to a difference between the thermal expansion coefficient of the solder 10 and the thermal expansion coefficient of the ceramic dielectrics 22, so that a crack may occur in the ceramic dielectrics 22. Additionally, in the case of the ceramic capacitor having lead wires, a stress applied to the lead wires 8-1, 8-2 is directly applied to the element 4, so that the stress may cause a crack 28 on the element 4 side. The integration of the element 4 side and the lead wires 8-1, 8-2 causes an adverse effect.

B of FIG. 5 shows the case of avoiding the formation of the silver electrode layer 6-2 on the edge portion of the copper electrode layer 6-1 and forming the oxidation treatment layer 26 on the edge portion side of the copper electrode layer 6-1.

By forming the oxidation treatment layer 26 on the edge of the copper electrode layer 6-1 leading to the lower edge side of the element 4 so as to avoid the adhesion of the solder 10 in this way, the solder 10 does not adhere to the ceramic dielectrics 22 and the occurrence of the crack 28 due to the difference between the thermal expansion coefficients can be prevented. Additionally, a space portion 30 can be set between the lower edge side of the element 4 and the lead wires 8-1, 8-2. The space portion 30 can allow a movable range of the lead wires 8-1, 8-2.

With this configuration, the concentration of stress to the lead wires 8-1, 8-2 toward the element 4 side can be avoided, and the occurrence of the crack 28 of the element 4 can be prevented.

Effects Etc. of Example 1

Features and advantages of Example 1 are listed as follows.

(1) The solder 10 is prevented from adhering to the ceramic dielectrics 22, so that the crack 28 of the ceramic dielectrics 22 can be restrained from occurring due to the difference between the thermal expansion coefficients.

(2) The action of stress from the lead wires 8-1, 8-2 to the element 4 can be reduced, and inconveniences such as damage of the element 4 can be avoided.

(3) Since the movable range of the lead wires 8-1, 8-2 is ensured by the space portion 30, an external force due to product weight and vibration acceleration is not concentrated on the root portion of the lead wires, so that the lead wires 8-1, 8-2 can be prevented from breaking.

Example 2

Figure 6:
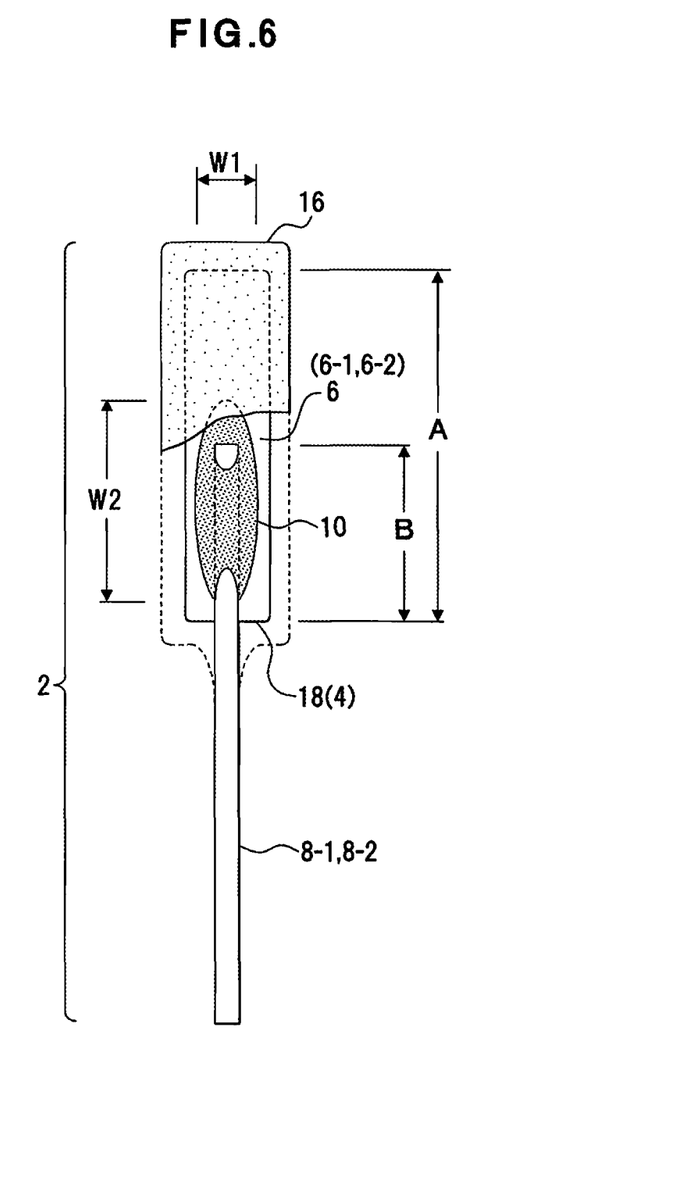
FIG. 6 is a diagram of a capacitor showing a connection position of the lead wire.

FIG. 6 shows a capacitor showing a connection position of a lead wire, and is an example of a lead-wire connection side surface portion of the capacitor 2 with the exterior resin layer 16 partially removed.

On the silver electrode layers 6-2, for example, the lead wires 8-1, 8-2 are disposed in a range of one-half or less in the height direction of the capacitor from the element end 18 side and connected by the solder 10. For example, when the length in the longitudinal direction is A and the length of overlap of the lead wires 8-1, 8-2 with the silver electrode layers 6-2 is B, for example, the lead wires 8-1, 8-2 are in the following relationship:

$$B \leq A/2 \quad (2).$$

The solder 10 has an oval shape, for example, and has a minor axis width W1 and a major axis width W2.

The height direction of the capacitor refers to the Y-axis direction of FIG. 1, and "upper" or "high" indicates the direction in which the element body 4-1 is disposed, while "lower" or "low" indicates the direction in which the element body 4-2 is disposed.

Additionally, as shown in FIG. 1, when the element width in the X-axis direction (width between the silver electrode layers 6-2 surfaces), between the edge surfaces of the element 4, is W3, and the arrangement interval of the lead wires 8-1, 8-2 narrowed by the slope portions 14 with respect to the element width W3 is W4, a narrowing width ΔW is as follows:

$$\Delta W = W3 - W4 \quad (3)$$

and, when the lead wire diameter is Ø, the narrowing width ΔW is set to as follows:

$$\Delta W/2 \geq \emptyset \quad (4),$$

for example, or may be set to as follows:

$$\Delta W/2 < \emptyset \quad (5).$$

When the length of the slope portions 14 in the Y-axis direction is D and the inclination angle of the slope portions 14 is θ, tan θ is as follows:

$$\tan \theta = D/(\Delta W/2) \quad (6)$$

and θ may be set to about 80 to 45 [degrees].

As shown in FIG. 1, each of the copper electrode layers 6-1 may have a protruding portion 23 formed by allowing an edge portion of the copper electrode layer 6-1 to go round to the end surface side in the Y-axis direction of the element 4. This protruding portion 23 may be formed on each of the upper and lower edge portions of the copper electrode layers 6-1.

Effects Etc. of Example 1

(1) Since the composite capacitance C is acquired by including the two element bodies 4-1, 4-2, the surface area per layer of the internal electrode 20 can be made smaller as compared to when the capacitance is acquired from one element body and the number of laminated layers of one internal electrode group can be reduced, so that the influence of electrostriction can be decreased. In particular, since the capacitance of the ceramic capacitor depends on the total area of the internal electrodes, a surface area of each of internal electrode layers must be made larger, or the number of the laminated layers must be increased, so as to acquire a larger capacitance. However, such a structure makes the influence of electrostriction larger. When subjected to the influence of electrostriction, expanding motion of the internal electrode group occurs in the lamination direction, and a force in the contraction direction acts such that the internal electrodes 20 are pulled toward the center side. In this case, when the surface area of each of the internal electrode layers is increased, the force of contraction toward the center becomes larger and, when the number of laminated layers is increased, the force of expansion in the lamination direction becomes larger. However, by using a plurality of the element bodies 4-1, 4-2, an increased capacitance can be achieved while adopting a structure in which the surface area per layer of the internal electrode 20 is made smaller and the number of laminated layers per internal electrode group is reduced.

(2) Since the length B of the disposition region of the lead wires 8-1, 8-2 is set to A/2 or less (B≤A/2) with respect to the length A of the element 4, the proportion of the lead wires 8-1, 8-2 to the element 4 can be reduced to make the product weight of the capacitor 2 smaller. In other words, the capacitor 2 can be reduced in weight and made compact. The capacity can be enlarged with respect to the volume.

(3) Since the disposition region of the lead wires 8-1, 8-2 to the element 4 is shifted to the root side of the lead wires 8-1, 8-2, the capacitor 2 can be reduced in weight and the center of gravity of the element 4 can be displaced to the root side of the lead wires 8-1, 8-2 and, even if an external force due to product weight and vibration acceleration acts on the element 4, the vibration and oscillation of the element 4 can be suppressed and the lead wires 8-1, 8-2 can be prevented from breaking.

(4) Since the disposition region of the lead wires 8-1, 8-2 to the silver electrode layers 6-2 serving as a portion of the external electrodes 6 on the element 4 is located on the element end 18 side of the element 4, the vibration and oscillation of the element 4 can be suppressed and the lead wires 8-1, 8-2 can be prevented from breaking.

(5) Since the lead wires 8-1, 8-2 are attached only to a portion corresponding to the internal electrodes 20 of the element body 4-2 of the element 4, a defect of the attached portion due to electrostriction can be suppressed. As described above, a displacing force acts on the element 4 due to the influence of electrostriction. In this case, the force acts on the attached portion of the lead wires 8-1, 8-2 such that the internal electrodes 20 expand in the width direction with respect to the attached surface. On the other hand, a center portion of the element 4 without the internal electrodes 20 of the element bodies 4-1, 4-2 is not affected and displaced by electrostriction. If the portions affected and not affected by electrostriction are arranged in order on the attached surfaces of the lead wires 8-1, 8-2, a multiplicity of portions in which displacement amount is different exists in terms of the entire attached portions of the lead wires 8-1, 8-2, and the attached positions may be affected. However, when the lead wires 8-1, 8-2 are attached only to a lower portion of the element 4, the difference in displacement amount due to the electrostriction is small and hardly affects the attached portions, so that the connection strength is improved.

(6) When the length B of the connection of the lead wires 8-1, 8-2 is set to A/2 or less (B≤A/2) with respect to the length A of the element 4, the connection strength can be maintain even when affected by electrostriction. Even if the electrostriction displacement amount increases and the strength decreases in the attached portions to the lead wires 8-1, 8-2 corresponding to the portion in which the internal electrodes 20 is disposed, the connection strength is not affected in the attached portions to the lead wires 8-1, 8-2 in the center portion of the element 4 not affected by the electrostriction because of no disposition of the internal electrodes 20, so that the connection strength is maintained in the ceramic capacitor as a whole.

(7) Since the protruding portions 23 of the copper electrode layers 6-1 go round to the end surface side of the element 4, the fixation and integration of the copper electrode layers 6-1 to the element 4 are enhanced, and the fixation between the element 4 and the external electrodes 6 can be enhanced.

Experimental Result 1

It was confirmed that even if the connection range of the lead wires 8-1, 8-2 to the element 4 is reduced as in the embodiment, the tensile strength of the lead wires 8-1, 8-2 to the element 4 does not decrease.

Experimental Result 2

It was confirmed that even if the connection range of the lead wires 8-1, 8-2 to the element 4 is reduced as in Example 2, the tensile strength of the lead wires 8-1, 8-2 to the element 4 does not decrease. In an experiment, this was confirmed by applying a tensile force to the lead wires 8-1, 8-2 in respective opposite directions and comparing a tensile strength [N] when the lead wires 8-1, 8-2 are peeled from the external electrodes 6.

It was confirmed that since the element 4 is covered with the exterior resin layer 16 from above the lead wires 8-1, 8-2, the tensile strength of the lead wires 8-1, 8-2 is improved in accordance with the thickness and rigidity of the exterior resin layer 16. It was confirmed by actual measurement that the tensile strength of the lead wires 8-1, 8-2 is increased by a factor of two or more.

Other Embodiments a) Although the lead wires 8-1, 8-2 are used in the embodiment, the present invention is applicable to a capacitor in a form in which the ceramic capacitor is directly disposed on a substrate without a lead wire such that the external electrodes 6 and a circuit pattern on the substrate are soldered.

b) Although the oxidation treatment layer 26 is exemplified as an example of the solder non-adhesive layer in the embodiment, an insulating layer or a conductor layer having a solder non-adhesive property may be used instead of this oxidation treatment layer 26.

C) Although the ceramic capacitor having a configuration with two electrode groups is exemplified in the embodiment, the capacitor may have a structure with one electrode group.

d) Although the exterior resin layer 16 is disposed in the embodiment, the exterior resin layer 16 may be eliminated.

e) In the embodiment, the silver electrode layer 6-2 is laminated on the general flat surface of the copper electrode layer 6-1 serving as the external electrode 6, and the copper electrode layer 6-1 is exposed from the window portions 24 formed by applying the silver electrode layer 6-2 in a net-like shape or a mesh shape. However, the present invention is not limited thereto. The capacitor 2 may have the net-like or mesh-shaped silver electrode layer 6-2 formed in the region of disposition of the lead wires 8-1, 8-2, for example. In other words, the external electrode 6 having only the copper electrode layer 6-1 without the silver electrode layer 6-2 may be formed by forming no silver electrode layer 6-2 in the region in which the lead wires 8-1, 8-2 are not disposed.

With regard to the portion in which the lead wires 8-1, 8-2 are not disposed, a roughened surface may be formed by applying an oxidation treatment to the surface of the copper electrode layer 6-1. The exterior resin layer 16 is directly disposed on this roughened surface, and the exterior resin layer 16 is closely attached to the roughened surface.

The oxidation treatment may be achieved by oxidizing the exposed surface of the copper electrode layer 6-1 during the firing treatment performed after applying and drying the silver electrode layer 6-2 following the application and drying of the copper electrode layer 6-1, for example, or may be provided by applying, drying and firing the copper electrode layer 6-1 for the oxidation treatment, partially exposing the copper electrode layer 6-1, and forming the silver electrode layer 6-2.

According to such a configuration, for example, the formation range of the silver electrode layer 6-2 with respect to the element 4 can be made smaller and the electrode material such as silver can be reduced, so that the manufacturing costs can be suppressed. By roughening the copper electrode layer 6-1, the adhesion between the roughened surface thereof and the exterior resin layer 16 is enhanced, so that the protection of the element 4 by the exterior resin layer 16 can be enhanced. The bonding between the copper electrode layer 6-2 and the lead wires 8-1, 8-2 can be reinforced by the adhesion between the exterior resin layer 16 and the external electrode 6 and the rigidity of the exterior resin layer 16 so as to prevent the occurrence of damage such as breakage of the lead wires 8-1, 8-2.

f) Although the laminated ceramic capacitor is exemplified as an example of the capacitor in the embodiment, the present invention may be applied to other capacitors.

g) Although the element bodies 4-1, 4-2 are included as two elements in the structure of the embodiment, the structure may include one element or three elements.

h) Although the external electrode 6 includes the copper electrode layer 6-1 and the silver electrode layer 6-2 in the configuration of the embodiment, the external electrode may have a single-layer structure, or include two or more electrode layers. For example, in consideration of the connectivity to the internal electrodes, a nickel plating layer and a tin plating layer may be formed in order after forming the copper electrode layer, or a resin mixed with a silver filler, a nickel plating layer, and a tin plating layer may be formed in order after forming the copper electrode layer.

Aspects of a capacitor and a method for manufacturing a capacitor extracted from the embodiments and the examples described above are as follows.

According to an aspect of a capacitor, a capacitor includes a capacitor element having internal electrodes and dielectric layers, the internal electrodes and the dielectric layers being alternately laminated; a first electrode layer formed on an edge surface of the capacitor element and connected to an internal electrode of the internal electrodes; and a second electrode layer formed into a mesh shape or a dot shape on the first electrode layer.

In the capacitor, the first electrode layer may have an exposed surface portion that is an oxidation treatment layer.

The capacitor may further include a lead wire connected to the second electrode layer. The oxidation treatment layer may be present by a root portion of the lead wire on the capacitor element side.

In the capacitor, a lead wire connected to the second electrode layer may be disposed in a range equal to or less than one-half of the length of the capacitor element in a height direction.

The capacitor may further include an exterior resin layer covering the capacitor element from above the lead wire soldered to the second electrode layer.

In the capacitor, the first electrode layer may be roughened in a range in which the lead wire is not connected.

In the capacitor, the capacitor element may include a plurality of internal electrode groups, each internal electrode group having the internal electrodes and the dielectric layers, the internal electrodes and the dielectric layers being alternately laminated. The plurality of internal electrode groups may be stacked in the height direction.

According to an aspect of a method for manufacturing a capacitor, a method for manufacturing a capacitor includes laminating internal electrodes and dielectric layers into a plurality of layers to form a capacitor element; forming a first electrode layer on an edge surface portion of the capacitor element, the first electrode layer being connected to an internal electrode of the internal electrodes; and forming a mesh-shaped or dot-shaped second electrode layer on the first electrode layer.

According to aspects of the capacitor or the method for manufacturing the capacitor of the embodiments and the examples, any of the following effects can be acquired.

(1) Since the second electrode layer is formed in a divided manner, the individual second electrode layer are reduced in area. Therefore, a distortion due to thermal expansion of the individual second electrode layer and the ceramic dielectrics is reduced, so that the ceramic dielectrics can be restrained from cracking.

(2) The product deterioration can be prevented and the reliability of the capacitor can be increased.

As described above, the most preferable embodiments etc. of the capacitor and the method for manufacturing the same according to the present invention have been described. The present invention is not limited to the above description. The present invention can variously be modified and altered by those skilled in the art based on the spirit of the invention described in claims or disclosed in modes for carrying out the invention. These modifications and alterations obviously fall within the scope of the present invention.

The capacitor and the method for manufacturing the same according to the present invention can suppress cracking occurring in a ceramic dielectrics due to a stress attributable to a difference between the external electrode and the ceramic dielectrics of the element in thermal expansion coefficient, and are therefore beneficial because of the ability to enhance the product reliability etc.

What is claimed is:
1. A capacitor comprising:
   a capacitor element having internal electrodes and dielectric layers, the internal electrodes and the dielectric layers being alternately laminated;
   a first electrode layer formed on an edge surface of the capacitor element and connected to an internal electrode of the internal electrodes; and
   a second electrode layer formed into a mesh shape or a dot shape on the first electrode layer,
   wherein the first electrode layer has an exposed surface portion that is an oxidation treatment layer.

2. The capacitor according to claim 1, further comprising:
   a lead wire connected to the second electrode layer, wherein
   the oxidation treatment layer is present by a root portion of the lead wire on the capacitor element side.

3. The capacitor according to claim 1, further comprising:
   a lead wire connected to the second electrode layer, the lead wire being disposed in a range equal to or less than one-half of the length of the capacitor element in a height direction.

4. The capacitor according to claim 2, wherein the lead wire is disposed in a range equal to or less than one-half of the length of the capacitor element in a height direction.

5. The capacitor according to claim 1, further comprising:
   a lead wire soldered to the second electrode layer; and
   an exterior resin layer covering the capacitor element from above the lead wire.

6. The capacitor according to claim 3, further comprising:
   an exterior resin layer covering the capacitor element from above the lead wire, wherein
   the lead wire is soldered to the second electrode layer.

7. The capacitor according to claim 2, wherein the first electrode layer is roughened in a range in which the lead wire is not connected.

8. The capacitor according to claim 3, wherein the first electrode layer is roughened in a range in which the lead wire is not connected.

9. The capacitor according to claim 1, wherein the capacitor element includes a plurality of internal electrode groups, each internal electrode group having the internal electrodes and the dielectric layers, the internal electrodes and the dielectric layers being alternately laminated, and wherein the plurality of internal electrode groups is stacked in the height direction.

10. The capacitor according to claim 2, wherein the capacitor element includes a plurality of internal electrode groups, each internal electrode group having the internal electrodes and the dielectric layers, the internal electrodes and the dielectric layers being alternately laminated, and wherein the plurality of internal electrode groups is stacked in the height direction.

11. The capacitor according to claim 3, wherein the capacitor element includes a plurality of internal electrode groups, each internal electrode group having the internal electrodes and the dielectric layers, the internal electrodes and the dielectric layers being alternately laminated, and wherein the plurality of internal electrode groups is stacked in the height direction.

12. The capacitor according to claim 4, wherein the capacitor element includes a plurality of internal electrode groups, each internal electrode group having the internal electrodes and the dielectric layers, the internal electrodes and the dielectric layers being alternately laminated, and wherein the plurality of internal electrode groups is stacked in the height direction.

13. The capacitor according to claim 7, wherein the capacitor element includes a plurality of internal electrode groups, each internal electrode group having the internal electrodes and the dielectric layers, the internal electrodes and the dielectric layers being alternately laminated, and wherein the plurality of internal electrode groups is stacked in the height direction.

14. The capacitor according to claim 8, wherein the capacitor element includes a plurality of internal electrode groups, each internal electrode group having the internal electrodes and the dielectric layers, the internal electrodes and the dielectric layers being alternately laminated, and wherein the plurality of internal electrode groups is stacked in the height direction.

15. A method for manufacturing a capacitor, the method comprising:
- laminating internal electrodes and dielectric layers into a plurality of layers to form a capacitor element;
- forming a first electrode layer on an edge surface portion of the capacitor element, the first electrode layer being connected to an internal electrode of the internal electrodes;
- forming a mesh-shaped or dot-shaped second electrode layer on the first electrode layer; and
- forming an oxidation treatment layer on an exposed portion of the first electrode layer.

* * * * *